M. Colgan,
Making Chains,

Nº 47,241. Patented Apr. 11, 1865.

UNITED STATES PATENT OFFICE.

MICHAEL COLGAN, OF PORT JERVIS, NEW YORK, ASSIGNOR TO HIMSELF, CHARLES D. COOPER, AND L. H. BECKWITH, ALL OF SAME PLACE.

CHAIN-HOOK.

Specification forming part of Letters Patent No. 47,241, dated April 11, 1865.

*To all whom it may concern:*

Be it known that I, MICHAEL COLGAN, of Port Jervis, in the town of Deer Park, in the county of Orange, in the State of New York, have invented certain new and useful Improvements in Iron Grab-Hooks for Hitching and Fastening Chains; and the following is a full, clear, and exact description of the same, reference being had to the accompanying drawings, making a part of this specification, in which—

Figure 1:
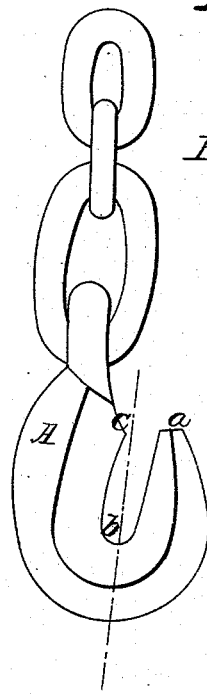
Figure 2:
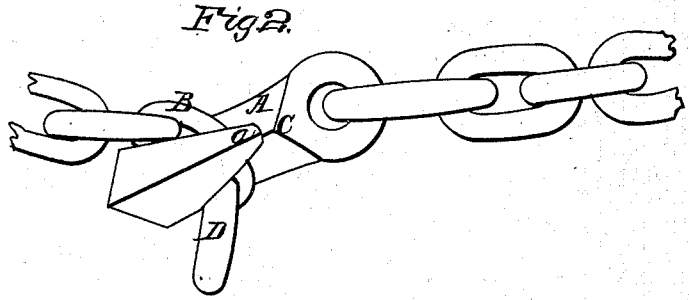
Figure 3:
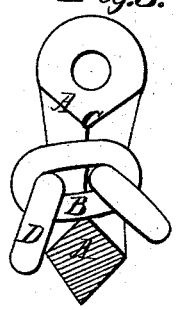

Figure 1 represents a side view of the hook attached to a chain. Fig. 2 shows an edge view of the hook as it is fastened on the chain. Fig. 3 shows a section of chain and hook, the point removed.

The object of my invention is to make a quick and sure fastening, that will not slip when under strain, and easily relieved when slackened.

The nature of my invention consists in the form of the hook and the manner of placing it onto the chain, so that the whole strength of the chain is retained, the draft being around the whole chain, instead of one side of the link, when the hook is placed in the link.

To enable others skilled in the art to make and use my invention, I will describe it in detail, referring to the drawings, and to the letters of reference marked thereon.

My improved chain-hook A is made of square bar iron, tapered to a point, *a*, and bent so that one of the square corners forms the inner portion of the curve *b*, the space between the point *a* and the heel of the hook C being of sufficient width to allow it to pass easily on or around the link B of the chain, it bearing edgewise on the link B and against the link D at right angles, so that it takes the whole strength of the chain on both sides, and the tendency is to press the links inward and narrow up the space of open-link chains rather than spread the links, as is the case when the hook is made so that it will hook into the link.

My improved hook A may be used with barred-link chains, which will not admit of hooks being hitched into, the size of the hook A being such as to give it the proportionate strength of the rest of the chain, and its form and construction being so arranged that it will readily adjust itself to the chain when brought in contact with it, and fix its bearing about equally on the link B and against the link D, so that no part of the chain is subjected to all of the strain when great force is applied or a sudden jerk is produced, as in the starting of a train of cars or the tension on a chain cable by the heaving of the billows. The construction of hooks as above described is not only sure to hold when there is strain on the chain, but it has the advantage of being easily liberated when the chain is slacked up, thus making it a most simple and efficient mode of coupling cars, and for all the various purposes for which chains and hooks are used.

It will readily be seen there is great utility in the form of the hook and the manner of hitching it to the chain in the way herein described, as all hooks designed to hitch into the link will sometimes become so tight in the place that they are unhitched with much difficulty, and when great force is applied to the chain either the hook or the link that the hook is in is very liable to be broken.

Having thus fully described my invention, what I claim as new, and desire to secure by Letters Patent, is—

The hook A, in combination with corresponding suitable-size chain-links, B and D, so constructed that the hook will grasp the chain in the manner herein described, for the purposes set forth.

MICHAEL COLGAN.

Witnesses:
 JOHN SHEHEN,
 THOMAS × GARVEY.
  his
  mark.